United States Patent [19]

Siepser

[11] Patent Number: 4,993,936
[45] Date of Patent: Feb. 19, 1991

[54] APPARATUS FOR COMPRESSING, DEFORMING AND DEHYDRATING EXPANSILE, HYDROGEL INTRAOCULAR LENS

[76] Inventor: Steven B. Siepser, 866 Downingtown Pike, West Chester, Pa.

[21] Appl. No.: 339,007

[22] Filed: Apr. 17, 1989

[51] Int. Cl.⁵ .................. B29C 43/04; B29C 43/54
[52] U.S. Cl. .................... 425/408; 264/2.6; 264/2.7; 425/411; 425/419; 425/808
[58] Field of Search .......... 623/6; 264/2.6, 2.7, 264/107; 425/808, 420, 395, 810, 398, 408, 419, 397, 411

[56] References Cited

U.S. PATENT DOCUMENTS

| | | | |
|---|---|---|---|
| 2,078,832 | 4/1937 | Bolk | 425/420 |
| 2,532,501 | 12/1950 | Johnson | 425/808 |
| 3,362,045 | 1/1968 | Hinton et al. | 425/388 |
| 3,733,159 | 5/1973 | Coffman | 425/808 |
| 4,138,086 | 2/1979 | Mitzutani et al. | 425/808 |
| 4,409,170 | 10/1983 | Stofko | 425/420 |
| 4,569,807 | 2/1986 | Boudet | 264/2.7 |
| 4,702,865 | 10/1987 | Koziol et al. | 425/808 |
| 4,734,118 | 3/1988 | Marechal et al. | 425/808 |
| 4,737,322 | 4/1988 | Bruns et al. | 264/1.7 |

FOREIGN PATENT DOCUMENTS

| | | | |
|---|---|---|---|
| 0270257 | 6/1988 | European Pat. Off. | 623/6 |
| 1166582 | 11/1958 | France | 425/808 |
| 1252249 | 12/1960 | France | 425/808 |
| 53-224724 | 12/1983 | Japan | 425/808 |
| 59-95118 | 6/1984 | Japan | 264/2.7 |

Primary Examiner—Jay H. Woo
Assistant Examiner—Khanh P. Nguyen
Attorney, Agent, or Firm—Eugene E. Renz, Jr.

[57] ABSTRACT

A device for reducing a dimension of an expansile hydrogel intraocular lens having an optic portion including two plate members for supporting the lens in a compressing chamber and actuateable towards one another to apply a compressive force to the optic to simultaneously dehydrate the lens and to reduce the cross sectional dimension of said lens to a dimension less than the maximum cross section in the hydrated state.

5 Claims, 3 Drawing Sheets

APPARATUS FOR COMPRESSING, DEFORMING AND DEHYDRATING EXPANSILE, HYDROGEL INTRAOCULAR LENS

FIELD OF THE INVENTION

This invention relates to an apparatus for making expansile, hydrogel intraocular lenses more useful in small incision cataract surgery. More particularly, this invention relates to a device for reducing the cross-sectional diameter of a expansile, hydrogel intraocular lens by compressing and deforming the lens during the dehydration phase.

BACKGROUND OF THE INVENTION

Expansile, intraocular lenses have been designed to take advantage of the swelling and expansion upon hydration of hydrophilic materials. This permit the lenses prior to implantation to be smaller than other implants, or previously non-expansile artificial lenses since the expansile lenses are hydrated by the fluid present in the normal eye and expand to the predetermined, desired, optically correct size. Intraocular lenses are composed of a dry, solid hydrophilic material capable of expansion by absorbing the fluid present in the eye by hydration to a final diameter up from about 5 millimeters to about 14 millimeters to reach the predetermined, optically correct lens for the particular patient. These dehydrated lenses have a minimum diameter of about 3 millimeters and an maximum of about 5 millimeters in the dry state, which, of course, is less than the diameter of existing non-expansile lenses. This has permitted the implantation of intraocular lenses through an incision corresponding to less than 5 millimeters diameter compared to the non-expansile, intraocular lenses which require an incision of at least 6 millimeters and up to 10 millimeters.

Despite the above-mentioned reduction in lens size, the need for still smaller intraocular lenses is recognized. Wound size has always been extremely important in ophthalmology for the size of the wound determines the amount of the astigmatism and the speed of healing in the eye. This need for smaller size intraocular lenses has been at least partially fulfilled by reducing the cross-sectional diameter of the intraocular lenses by compressing the lens during the dehydration phase as pointed out in my recently issued U.S. Pat. No. 4,813,954. Up till the present time, intraocular lenses of about 3.2 millimeters in size in the totally dehydrated, untouched state have been made. Such lenses then swell to approximately 5.8 millimeters. Because of the limitation in the plastic material employed, limitation in the insertion size seems to be somewhere around 3 millimeters. By the use of the apparatus of my invention, the incision size has been reduced below 3.2 millimeters. The apparatus functions by compressing and deforming the hydrated intraocular lens as it is dried under a constant force, the deformation being maintained as the lens becomes dehydrated.

As is the case with all lenses, expansile intraocular lenses being no exception, they must be oriented along the visual axis within the eye. The visual axis is an imaginary line which passes actually through the center of the lens and extends through the pupil and cornea. The lens must be centrally oriented along this axis in the path of the light to the retina. The curved front and back surfaces of the lens or disc must be precisioned on the same axis to provide an optically correct orientation. To provide such orientation haptic loops are employed. Their purpose is to anchor the lens in a central position along the visual axis. The curved portion of the loops contact the chamber walls and hold the lens in place. In designing an apparatus to fabricate intraocular lenses for insertion in minimal incisions consideration must be given to placement of the haptic loops. They must maintain their orientation during any deformation of the optic.

OBJECTS OF THE INVENTION

It is an object of this invention to design an apparatus which will fabricate intraocular lenses with haptic loops capable of being inserted through very small wounds and yet provide all the optical characteristics and qualities of larger lenses now in use.

It is another object to provide equipment for manufacturing deformed and dehydrated expansile, hydrogel intraocular lenses capable of returning to their original desired sizes after undergoing compressive deformation and dehydration which allows insertion through small phaceomulsification wounds.

Still another object is to provide a device for deforming an expansile hydrogel intraocular lens by compressive forces during dehydration causing the lens to change from its original round or disk shape to a form in which at least one dimension is smaller than the others permitting insertion through the smallest incision possible.

It is a further object of the invention to provide an apparatus capable of compressing the optic portion of the lens without subjecting the two haptic loops attached thereto to compression positioned in diametrically opposite locations about a central optic portion wherein the haptic loops are shaped to conform to and gently engage the capsular sack at diametrically opposite points providing support for the central optic portion.

SUMMARY OF THE INVENTION

The foregoing objects of the present invention are achieved by providing a device which is capable of deforming an expansile, intraocular lens under compression during dehydration. The device comprises a pair of generally rectangular plate members, the plate member having a recess or pocket at its approximate center for the optic of the lens. The upper face of the lower member has depressions for the haptic loops. The upper plate has a central spherical cavity on its inner face to register with the cavity in the lower plate. The plates are adapted to be secured face to face during the compression cycle. The amount of compression in the axial direction can be selectively varied. The lower plate is provided with two trackways extending on each side of the pocket for slidably receiving compression bars. These bars have confronting slightly curved inner faces which confront and engage the optic of the lens between the haptics during the compression cycle. There are also a means to provide for circulating a dehydrating medium through the compression cavity of the chamber. Means is also provided for selectively applying a predetermined lateral compression force to the bars. The compression force in the device of the present invention may be selectively varied and controlled to produce the desired controlled deformation of the lens without permanent deformation of the lens so that the advantages of having a small compressed lens for insertion is achieved and the lens rehydrates in the eye to the desired size and shape.

The reduction in cross-sectional diameter of the lens subjected to the method of U.S. Pat. No. 4,813,954 and utilizing the device of this invention allows insertion through incisions approximately 1 to 3 millimeters smaller in width than would ordinarily be required for a lens subject to dehydration only.

It is to be understood that the material from which the expansile, intraocular lens is made possesses sufficient memory to return to its original configuration upon rehydration. Thus as the lens rehydrates intraocularly, the natural flexibility and memory of the material returns and the lens resumes its original configuration. A dehydrated compressed lens such as prepared by means of the present invention takes advantage of a small incision surgery, making the operation less traumatic for the eye and reduces post-operative astigmatism.

BRIEF DESCRIPTION OF THE DRAWINGS

These and other objects of the present invention and the various features and details of the operation and construction thereof are hereinafter more fully set forth with reference to the accompanying drawings, where.

DESCRIPTION OF THE PREFERRED EMBODIMENT OF THE INVENTION

Figure 1:
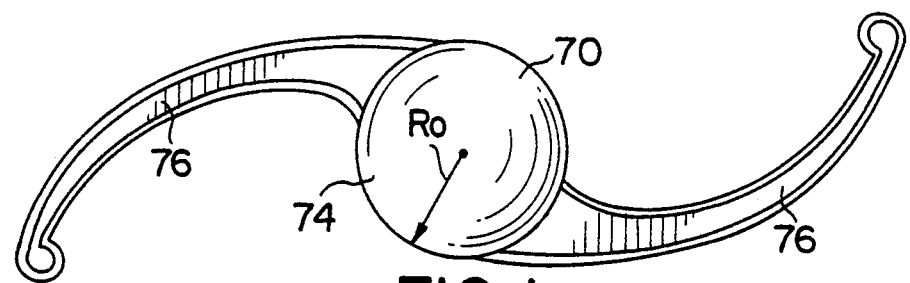
FIG. 1 is a top plan view of a hydrated lens before compression and dehydration.
Figure 2:
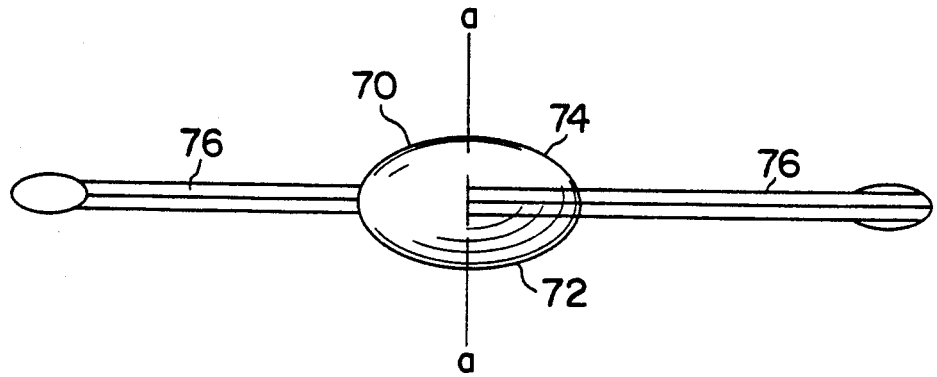
FIG. 2 is a side elevational view of the lens of FIG. 1.

Intraocular lens of the type to which the present invention relate as described above are made of a hydrogel material and are generally of the configuration shown in FIGS. 1 and 2 and are more fully described in my prior Patent, U.S. Pat. No. 4,556,998 which issued Dec. 10, 1985 entitled ARTIFICIAL INTRAOCULAR LENSES AND METHOD FOR THEIR SURGICAL IMPLANTATION. The lens generally comprise an optic portion O having a dome-like posterior surface P and a slightly curved anterior surface A which is ground or polished to correct for a given patient's sight problem and in the present instance, two curved haptics H which are of a relatively narrow cross section compared to the optic O as shown in FIGS. 1 and 2.

Figure 5:
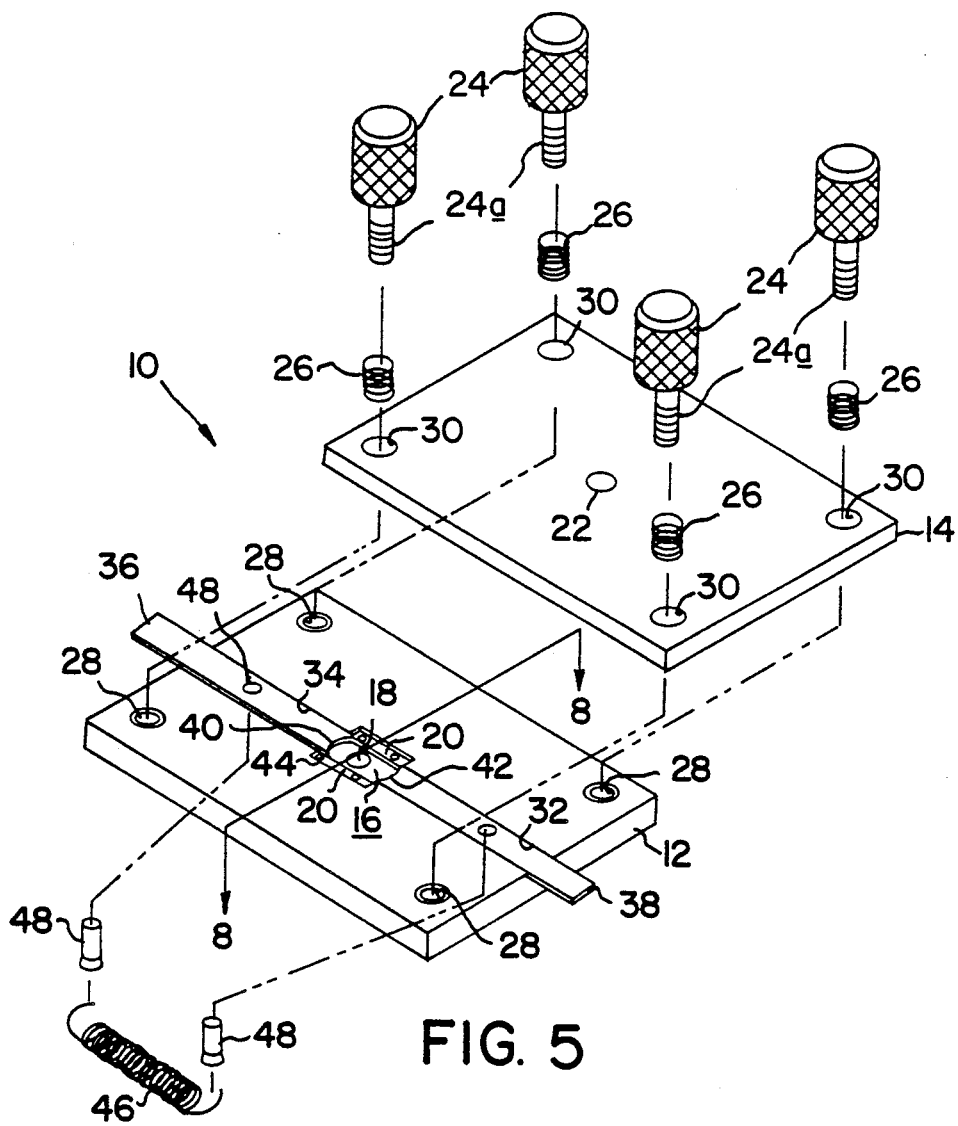
FIG. 5 is a perspective view of the lens decompression and dehydration device of the present invention.
Figure 6:
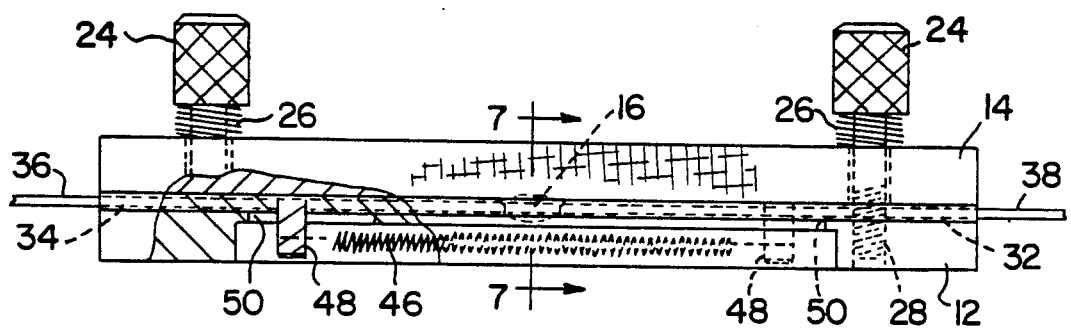
FIG. 6 is a side elevational view with parts broken away to show the compression bar actuator assembly.
Figure 7:
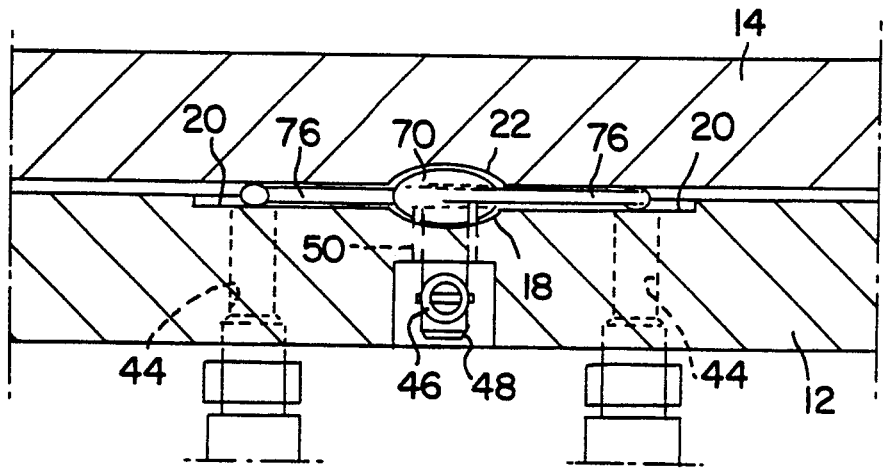
FIG. 7 is a cross section view taken on lines 6—6 of FIG. 6 showing a lens in the compression chamber.
Figure 8:
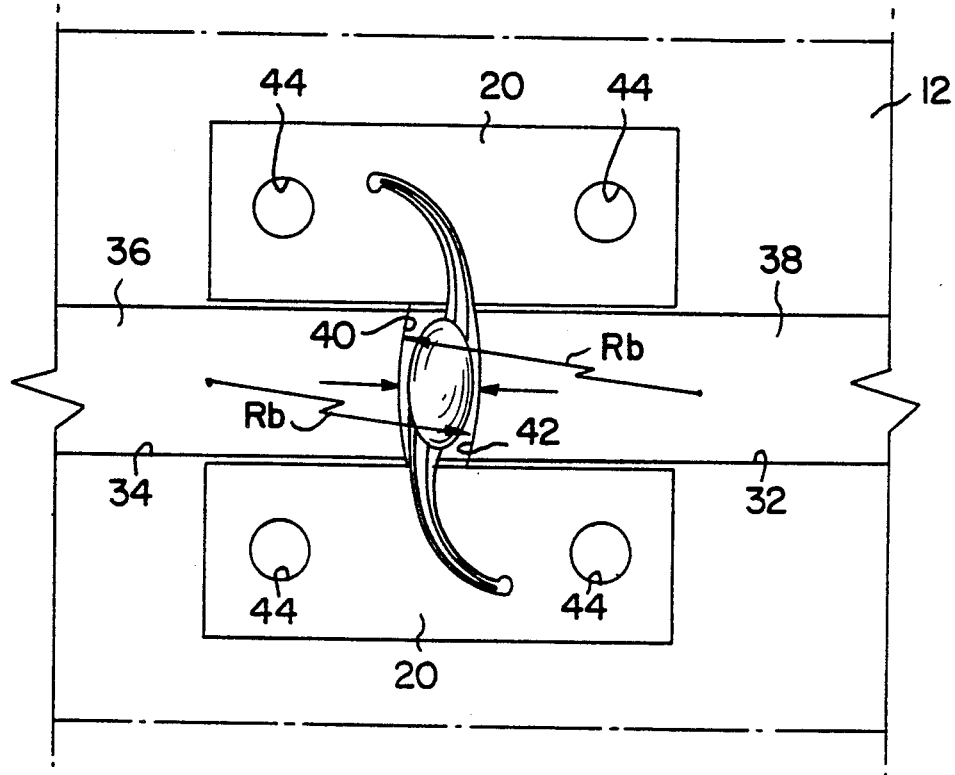
FIG. 8 is an enlarged fragmentary plan view of the lens in the compression chamber with the top of the device removed.

Referring now to the drawing and particularly to FIG. 5 thereof, there is illustrated a preferred embodiment of lens compression deformation dehydration device in accordance with the present invention. The device which is generally designated by the numeral 10 comprises a pair of generally rectangular plate members 12 and 14, one of the members having a recess or pocket 16 for the lens. In the present instance, the pocket is formed in the plate member 12 at approximately the center thereof and has a central generally circular or spherical depression 18 forming a locating seat for the bottom inner face of the optic of the lens. Surrounding the spherical indentation 18 is a generally rectangular cut out 20 in the upper face of the plate defining areas on either side of the depression for the haptic loops. The upper plate 14 which is also of generally rectangular form has a central spherical cavity 22 on the inner face which registers with the cavity 18 and is a locating pocket for the dome shaped outer face of the optic as explained in more detail below. The plates are adapted to be secured face to face during the compression cycle by means in the present instance comprising a series of screw fasteners 24 which have threaded shanks 24a engageable through openings 30 at the corners of the upper plate and receivable in tapped recesses 28 in the corners of the lower plate. In the present instance, springs 26 are provided so that the degree of compression in the axial direction may be selectively varied and in this manner control the axial force exerted on the lens to simply hold it in place in the desired position for the compression operation as explained hereafter.

Figure 3:
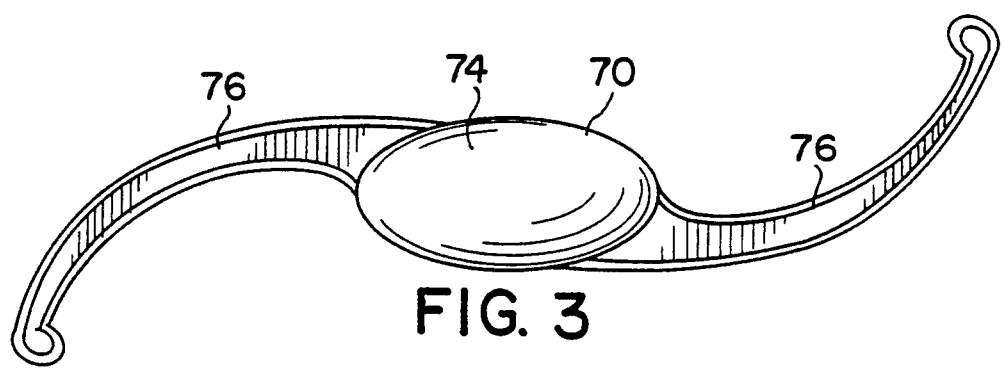
FIG. 3 is a top plan view of the lens after decompression and dehydration.
Figure 4:
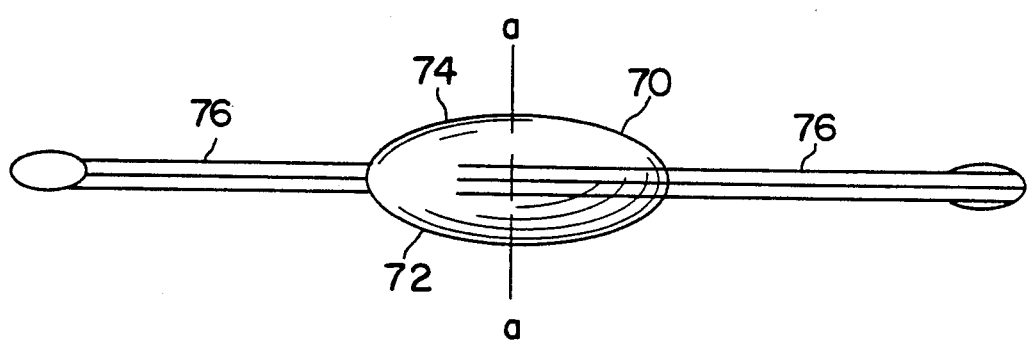
FIG. 4 is a side view thereof.

The lower plate 12 is provided with two trackways 32 and 34 on either side of the pocket 16 for slidably receiving two compression bars 36 and 38. The compression bars have confronting inner faces which are slightly curved as at 40 and 42 to conform generally to the curve of the optic. The radius of curvature Rb of the compression faces 40, 42 of the bars 36, 38 is preferably greater than the radius of curvature Ro of the uncompressed optic O to affect the desired deformation of the optic O to the oval shape shown in the FIG. 3 and thereby provide the desired smaller cross section for insertion of a lens through a very small incision in the eye.

In plate 12 next to the spherical depression 18 there is a carved out region 20 to allow for the insertion of the haptic loop. The haptic H must maintain its curved shape so as to assure that the intraocular lens or optic is properly centered both in the hydrated and dehydrated state. When the lens is placed in the apparatus of the invention, the configuration of this spherical depression 18 and carved out regions 20 defining the compression chamber 16 are critical. The dimple 22 helps to locate the optic O in a stable, central position. The step-like change between the optic and the region where the haptics are placed is due to the difference in thickness of the different power lenses and the standard width of the haptics. The haptic must remain free and remain in a flattened position as their configuration is important to the final implantation of the intraocular lens in the human eye. Distorting or changing the haptics during the period of compression will result in a distorted lens. If the haptics are not in their proper position when they are inserted in the eye, the intraocular lens would not have a chance to center and be in the intraocularly correct position. Therefore, the design of the step-like ridge where the haptics are not compressed while the optic is, is essential to the design of the apparatus of my invention.

In accordance with another feature of the present invention, means is provided for circulating a dehydrating medium through the compression cavity or chamber 16. In the present instance, there are four holes 44 adjacent the corners of the cavity outboard of the spherical dimple 22 in the center of the compression cavity. Means is provided for actuating the bars toward one another to selectively apply a predetermined lateral compression force to the lens comprising in the present instance a torsion spring 46 operatively connected to the compression bars.

More specifically, the spring 46 is connected to the compression bars 36, 38 via pins 48 at opposite ends of the spring 46 connected to the compression bars 36, 38, the pins engaging through slotted openings 50 aligned with the trackways 32, 34. In this manner, the compression bars 36, 38 are normally biased toward one another and are simply drawn back against the spring force when placing a lens to be compressed in the chamber. Releasable stop means may be provided to hold the bars in a retracted position during lens loading.

Consider a typical operational sequence for a device construction in accordance with the present invention. Initially, the plates 12, 14 which can be fabricated from metal or plastic such as methyl methacrylate are apart to expose the compression cavity 16 and permit a lens to be simply inserted in the cavity 16 with the compression bars 36, 38 retracted. In this position, the haptic loops lie in the side chambers between the air circulation ports. The top plate 14 is then carefully positioned over the lower plate 12 so that the dimple 18 on the inner face engages the dome shaped optic of the lens. In this position, the openings 30 and 28 are aligned at the four corners. The operator then simply turns the screw members 24 against the bias of the springs 26 to apply sufficient compression along the optic axis A—A of the lens to firmly support the lens in place in the compression cavity or chamber 16. A torsion spring 46 urges the compression bars 36, 38 inwardly towards one another so that the arcuate faces 40, 42 now exert a compression load or force in a lateral direction transverse to the optic axis A—A against the lens optic in the region between the haptics H as shown in FIG. 5. Over a predetermined period of time, the lateral force will produce a deformation of the optic O to the shape shown in FIG. 3.

In a resolution recovery experiment of six lenses as shown in the table, precompression focal lens in astigmatic checks were done. At higher temperature, the compression time was reduced from about 10 to 15 hours. When the temperatures were reduced below 100 degrees, the times were lengthened to almost 18 to 24 hours and at room temperature a 24 hour dehydration time with observed. It is interesting to note that in this preliminary study, the precompression size was approximately 5.7 millimeters and the smallest post-compression sizes varied from the smallest of 2.5 millimeters to as large as 3 millimeters. Some variation in post-compression, effective focal length was noted, but this was due to failure to cycle the plastic prior to its use.

| COMPRESSION, DEFORMATION, DEHYDRATION RESOLUTION RECOVERY EXPERIMENT | | | | | | |
|---|---|---|---|---|---|---|
| Prototype | A | B | C | D | E | F |
| Focal Lnth. | 77.6 | | 70.17 | 69.79 | 77.75 | 78.31 |
| Compress Time | 14:30 | 18:06 | 30:00 | 23:30 | 24:47 | 10:14 |
| Temperature | 100 F. | 90 F. | 95 F. | 95 F. | 70 F. | 105 F. |
| Pre-Size | | | | 5.6 mm | 5.7 mm | 5.7 mm |
| Post-Size | | | 2.5 mm | 3.2 mm | 3.0 mm | 2.7 mm |
| Post-EFL | 75.61 | 75.71 | 67.53 | 66.46 | 75.50 | 76.09 |
| EFL Change | 2.03 | 2.38 | 2.64 | 3.33 | 2.25 | 2.22 |
| Average EFL Change 2.48 | | | | | | |
| SECOND CYCLE | | | | | | |
| Compress Time | 10:05 | 72:20 | 15:27 | 23:34 | 23:25 | 24:00 |
| Pre-Size | | 5.5 mm | 5.7 mm | 5.6 mm | 5.7 mm | 5.7 mm |
| Post-Size | 3.1 | 1.9 | 2.6 | 2.6 | 2.6 | 2.1 |
| Temperature | 90 | 70 | 88 | 82 | 82 | 84 |

It will be understood that preferably compression is generated by constant force. For example, in a prototype model, rubber bands can be used because they do provide constant force compression. The lens is then compressed in a constant force manner and sandwiched between the two plate members 12 and 14. These plate members may be made of metal or plastic, such as, for example, polymethacrylate. These plates press down upon the lens keeping it centered and decreasing the amount of interior posterioral thickening of the lens and stopping and torque, twisting or curling of the lens' edges. Thus, in the apparatus of the present invention, the only way the lens can move is in a longitudinal fashion. This lengthens the implant as it dehydrates and since the lens reaches a solid state or what has been said to be a frozen "liquid" state, the lens remains in the dehydrated deformed shape until rehydrated.

It will be further understood that the device of this invention is capable of applying a predetermined variable selected compressive force to do the desired compression short of permanently deforming the lens.

One of the most important measurement of lenses fabricated utilizing the apparatus of this invention is the astigmatic change of the surface. This was measured carefully to determine whether compression and dehydration under force would allow the lenses to return to their normal spherical shape. If the lenses are not able to reach their original shape, then one of the axis would be shorter than the other and the curve of the front of the lens would vary and astigmatism or toric change would be developed. A study has been made and found this was not the case. The compressed, dehydrated and deformed lenses were rehydrated to their hydrated state, and resumed their spherical shape enabling them to accurately function as a pure spherical lens.

Since each intraocular lens is manufactured to a distinct power, as patients have different powered lenses in their eyes, the power conservation and maintenance of that power is critical. If lenses are distorted, evidence must be displayed that when they return to their original shape they have the same power as previously calculated and can be inserted with impunity in a patient needing that particular power. The range of power of an intraocular lens or any lens for that matter, is determined by the front and back curves and the refractive index of the material. The curves affect the incident and exit of light. The steeper the curves, the most close the point of focus is to the lens itself. In the human eye, and intraocular lens presently used powers are as low as 5 or having no power as high as 35 diopters of power. The most common range, however, is between 16 and 25 diopters of power. In summary, the distortion of the expansile, intraocular lenses which occur during the dehydration/compression phase is reversible and the previous diopter power of the lenses can be reached again once the lens reaches its hydrated size.

It should be understood that any hydrophilic materials known in the art for use as intraocular lenses may be used if they have suitable optical properties are capable of being formed into new lenses and are capable of hydration in the eye to expand as necessary following compression, deformation and dehydration. In addition to the polymethacrylate and hydroxyethylmethacrylate any of the high refractive index polymeric compositions can be employed. Particularly preferred lenses which can be subjected to compression, deformation and dehydration utilizing the apparatus of the invention are those described and claimed in U.S. Pat. No. 4,556,998.

Not only does the apparatus of the present invention enable the cross-sectional diameter of expansile intraocular lenses to have reduced cross-section but the resulting dehydrating deformed lens can be shipped and stored in its deformed state without refrigeration. The surgeon can introduce the lens into the human body without any specially designed instruments or technically demanding maneuvers and he can do all this with a minimum of wound. The deformed lenses, including any folded or rolled forms need no intraoperative devices as their shapes are maintained by dehydration alone. The deformation is totally reversed when the elastic memory of the hydrogel returns from rehydration.

What is claimed is:

1. An apparatus for reducing a cross sectional dimension of an expansile hydrogel intraocular lens having an optic portion with an optic axis comprising means defining a compression chamber for supporting the lens in a direction generally transversely to the optic axis and means for applying a biaxial constant compressive force to the optic portion along its optic axis and an axis generally transversely to the optic axis, thereby simultaneously dehydrating the lens and reducing the cross sectional dimension of said lens to a dimension less than the maximum cross section in a hydrated state.

2. An apparatus as claimed in claim 1 including a pair of plate members having said compression chamber defined in the opposing confronting surfaces of the plate members and means for moving the plate members together to apply a selective seating force to a lens in the compression chamber.

3. An apparatus as claimed in claim 1 wherein said compression chamber comprises a stepped cutout in the face of said plate members defining a chamber having a deeper section for the optic and a shallower section for haptics of the lens, there being a clearance between the haptics even when the plates fully seat the lens in the compression chamber.

4. An apparatus as claimed in claim 1 including at least one port communicating with the compression chamber to permit circulation of a dehydrating medium through the compression chamber.

5. An apparatus as claimed in claim 1 including side compression members movable in a direction generally transversely to the optic axis and operable to apply a compressive force to the optic portion of the lens and wherein said means for applying a biaxial constant compressive force comprises first spring means normally urging said plate members toward one another in the direction of the optic axis and second spring biasing means normally urging said compression members toward one another to engage the optic of the lens at diametrically opposed points during the compression dehydration cycle.

* * * * *